(12) United States Patent
Viciosa

(10) Patent No.: US 9,950,670 B2
(45) Date of Patent: Apr. 24, 2018

(54) FOLD REAR-VIEW MIRROR ASSEMBLY FOR MOTOR VEHICLES

(71) Applicant: Fico Mirrors, S.A.U., Barcelona (ES)

(72) Inventor: Jose Mendoza Viciosa, Barcelona (ES)

(73) Assignee: FICO MIRRORS, S.A.U., Barcelona (ES)

( * ) Notice: Subject to any disclaimer, the term of this patent is extended or adjusted under 35 U.S.C. 154(b) by 0 days.

(21) Appl. No.: 15/342,406

(22) Filed: Nov. 3, 2016

(65) Prior Publication Data

US 2017/0120825 A1 May 4, 2017

(30) Foreign Application Priority Data

Nov. 3, 2015 (EP) .................................... 15192801

(51) Int. Cl.
| | | |
|---|---|---|
| *G02B 5/08* | (2006.01) | |
| *B60R 1/074* | (2006.01) | |
| *B60R 1/12* | (2006.01) | |
| *B60R 1/076* | (2006.01) | |

(52) U.S. Cl.
CPC .............. *B60R 1/074* (2013.01); *B60R 1/076* (2013.01); *B60R 1/12* (2013.01); *B60R 2001/1253* (2013.01)

(58) Field of Classification Search
CPC ........... B60R 1/074; B60R 1/076; B60R 1/12; G60R 1/06

USPC ................................. 359/841, 871, 872, 877
See application file for complete search history.

(56) References Cited

U.S. PATENT DOCUMENTS 7,490,945 B2 * 2/2009 Proctor ................... B60R 1/074
248/478

FOREIGN PATENT DOCUMENTS

WO 03016094 A1 2/2003

* cited by examiner

*Primary Examiner* — Euncha Cherry
(74) *Attorney, Agent, or Firm* — Cantor Colburn LLP

(57) ABSTRACT

A rear-view mirror assembly comprises a fixed base member, a mirror housing that can be rotated relative to the base member, a shaft, an elastic element for applying a force on the base member and the mirror housing through the shaft, shaft axially retaining means, and safety means for preventing the shaft from being released comprising a first and second stop portions formed in the mirror housing and the shaft respectively and arranged such that in different shaft angular positions the first and the second stop portions do not interfere with one another such that the shaft can be inserted in the shaft housing, or the first and second stop portions interfere with one another preventing the shaft from being released from the shaft housing by the action of the elastic element in case of failure of the shaft retaining means.

14 Claims, 3 Drawing Sheets

FOLD REAR-VIEW MIRROR ASSEMBLY FOR MOTOR VEHICLES

CROSS-REFERENCES TO RELATED APPLICATIONS

This patent application claims priority to European Patent Application No. EP15192801.7 filed Nov. 3, 2015, which is incorporated herein by reference in its entirety.

BACKGROUND OF THE INVENTION

The present disclosure relates to rear-view mirror assemblies for motor vehicles of the type comprising a mirror housing that can be rotated relative to a base member mounted on the motor vehicle.

Fold rear-view mirror assemblies for motor vehicles are known in the art that comprise a mirror housing that can be rotated relative to a base member that is mounted on a fixed part of a motor vehicle. The mirror housing can be rotated to the base member according to at least a mirror operative condition or drive position and a mirror folded condition or parking position, and vice versa.

A shaft is provided for rotation of the mirror housing relative to the mirror base according to said positions. The shaft is typically arranged within the mirror housing and has a first end coupled to the mirror base and an opposite, second end provided with a radially protruding flange.

The shaft is surrounded by a compression spring. The compression spring has a lower end resting on the mirror base and an opposite upper end abutting on said radially protruding flange of the shaft. The compression spring thus acts between the mirror housing and the mirror base.

Document WO03016094 describes a foldable rear-view mirror assembly of the type mentioned above. It comprises a base element, a mirror housing and a shaft arranged for rotation of the mirror housing relative to the base element. A spring element is provided surrounding the shaft and arranged between a flange formed in the shaft and a flange formed in a sleeve secured to the mirror housing. The shaft has first, intermediate and second, lower abutment projections projecting towards the sleeve which pass through cutouts formed in the flange of the sleeve such that the first, intermediate abutment projections are movable into engagement with the flange in the sleeve so as to retain the spring element in a stressed state. The second, lower abutment projections engage to the base element with a bayonet connection that is retained in an engaged condition when the first, intermediate abutment projections are disengaged from the flange in the sleeve. As a result, the shaft is retained in the base element in an operating condition.

A problem associated with the above known rear-view mirror assemblies is related to potential danger to users and operators when the abutment projections of the shaft break or the bayonet connection is not properly engaged. In such a case, the spring and the shaft are released violently from the assembly which may result in serious damages to nearby persons and also to other parts of the assembly.

No known means to prevent this violent release are currently available so physical barriers are implemented at assembly stations or operators are equipped with protection masks to ensure safety of the operator such that, in case of failure of the abutment projections and violent release of the spring and the shaft, the released elements impact thereon instead of on the operator. However, these kinds of measures slow down production rates and increase production costs.

There is thus the need for a safe means for the rotational fastening of the mirror housing to the mirror base such that the spring arranged therebetween does not involve any risk to persons or to other parts of the assembly.

SUMMARY OF THE INVENTION

An improved fold rear-view mirror assembly for motor vehicles is provided herein. It comprises a base member for being mounted on a motor vehicle and a mirror housing for receiving a mirror pane therein.

The mirror housing is arranged in rotation relative to the base member around a mirror rotation axis between at least a mirror operative condition or drive position and a mirror folded condition or parking position, and vice versa.

A mirror pane may be received into the mirror housing for providing a substantially rear field of view to a vehicle driver when the mirror housing is positioned in the driving position. In some examples, the mirror housing may be adapted for receiving an imaging device configured for imaging an image of the surroundings of the vehicle, such as a video camera. The mirror pane may be an anti-glare mirror pane, such as a mirror pane using a cell of electrically changeable optical characteristic or a mirror pane using a liquid filtering layer of variable thickness. Examples of cells of electrically changeable optical characteristic are liquid-crystal and electrochromic mirrors. In further examples, the mirror pane may further comprise a heating element. A spotter mirror may be also received within the mirror housing and positioned so as to substantially provide vision of a vehicle blind spot region to the vehicle driver when the mirror housing is positioned in the driving position.

The base member may be provided with recesses formed therein for cooperating with corresponding projections formed in the mirror housing. Recesses and projections are part of a detent mechanism for locking the mirror housing in specific stable angular positions to the base member. Rotation of the mirror housing relative to the base member causes the projections of the mirror housing to slide relative to the recesses of the base member causing the mirror housing to be displaced vertically relative to the base member compressing a main spring until a mirror condition, such as a mirror folded or parking position, has been reached. Then, the mirror housing is displaced downwards again relative to the base member releasing the main spring. The process for turning the mirror housing back to the mirror operative condition or driving position is the same as disclosed but in the reverse order.

The mirror housing recesses may be provided instead in the gear wheel in motorized examples.

The present rear-view mirror assembly may further comprise a motor component and drive means associated with said motor component. The drive means comprise a gear wheel engaging the motor component with the base member for driving the mirror housing in rotation relative to the base member around the mirror rotation axis between at least the drive position and the parking position, and vice versa. The gear wheel may be disposed, for example, coaxially with the mirror rotation axis.

A shaft is provided for rotation of the mirror housing relative to the base member between a mirror operative condition and a mirror folded condition, and vice versa. The shaft is adapted to be inserted within a shaft housing. The shaft housing is formed by the base member or the mirror housing, or it may be formed by both the base member and the mirror housing.

The shaft is at least axially retained in the shaft housing through suitable shaft retaining means. The shaft retaining means may for example comprise at least one protrusion extending radially out of the shaft suitable for passing through a corresponding groove formed in the base member or in the mirror housing.

Associated with the shaft is an elastic element. The elastic element is arranged such that a force is applied on both the base member and the mirror housing through the shaft.

The elastic element may be for example a metal compression spring. Other elastic elements may be used as long as they are suitable for applying a force on both the base member and the mirror housing through the shaft.

The present rear-view mirror assembly further comprises safety means for preventing the shaft from being released from the shaft housing. The safety means comprise a first stop portion and a second stop portion. The first stop portion is formed in the mirror housing and the second stop portion is formed in the shaft, such as for example at one end of the shaft.

At least one of the first and second stop portions may be separate parts attached to the mirror housing and the shaft, respectively, by any suitable means. However, it is also envisaged that at least one of the first and second stop portions may be formed integrally therewith.

The first and second stop portions are arranged such that in one relative angular position of the shaft and the mirror housing, both the first and the second stop portions do not interfere with one another. In this condition, the shaft can be inserted freely in the shaft housing for assembly and disassembly operations such as for example when installing the rear-view mirror assembly or in service, repair or maintenance operations. Therefore, in this first relative angular position, the shaft retaining means do not interfere with the shaft housing such that the shaft can be inserted therein.

In another, different relative angular position of the shaft and the mirror housing, both the first and the second stop portions interfere with one another. This condition corresponds to an operating condition with the rear-view mirror assembly ready for operation. Therefore, in this second relative angular position, the shaft retaining means retain the shaft in the shaft housing. In this operating condition, the shaft is prevented from being released from the shaft housing by the action of the elastic element in case of failure of the shaft retaining means. The first and second stop portions may be thus formed respectively in the mirror housing and in the shaft such that a bayonet-type safety means is defined.

The first stop portion may be configured to be impacted by the second stop portion due to the effect of the elastic element in case of failure of the shaft retaining means. The safety means are thus provided in addition to the shaft retaining means.

In one example, the first stop portion may be a projecting portion extending radially towards an interior of the shaft housing. The second stop portion may be a projecting portion extending radially outwardly from the shaft at least partially covering its perimeter. Examples of angular extension of the stop portions will be given hereinbelow.

In some examples, at least one of the first and second stop portions may be configured to be broken due to the effect of the elastic element in case of failure of the shaft retaining means. Breaking of the at least one of the first and second stop portions allows impact energy of said at least one of the first and second stop portions to be absorbed when the shaft impacts the mirror housing. However, there may be also examples where at least one of the first and second stop portions may be configured to deform without breaking due to the effect of the elastic element in case of failure of the shaft retaining means. Deformation of the at least one of the first and second stop portions allows impact energy of said at least one of the first and second stop portions to be absorbed when the shaft impacts the mirror housing. The first and second stop portions may be configured to deform elastically and/or plastically.

At least one of the first and second stop portions may comprise a number of annular sectors. Regardless of whether the first and second stop portions may comprise a single part or a number of annular sectors, they may have an angular extension ranging from 45 to 180 degrees around the shaft. Other angular extensions are not ruled out. It is to be noted that the angular extension of the first stop portion may be equal to or different from the angular extension of the second stop portion.

Failure of the shaft retaining means has to be understood as a situation where the retaining means are unable to retain the shaft in the shaft housing. This includes breakage of the retaining means but does not exclude other possibilities such as a wrong assembly step where the retaining means are inappropriately positioned in the shaft housing.

Additional objects, advantages and features of examples of the present fold rear-view mirror assembly for motor vehicles will become apparent to those skilled in the art upon examination of the description, or may be learned by practice thereof.

BRIEF DESCRIPTION OF THE DRAWINGS

Particular examples of the present fold rear-view mirror assembly for motor vehicles will be described in the following by way of non-limiting examples, with reference to the appended drawings, in which.

DETAILED DESCRIPTION OF THE INVENTION

Figure 1:
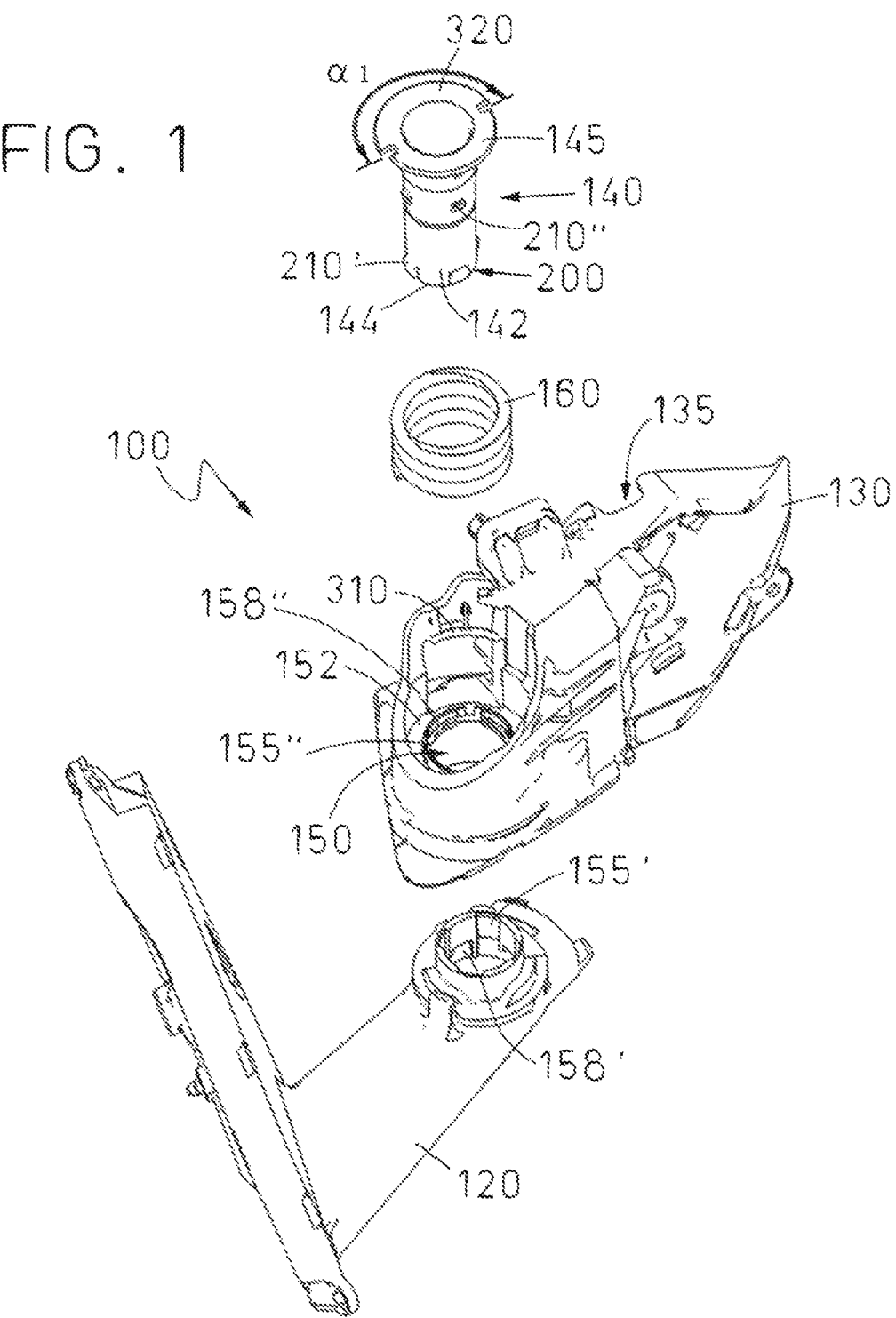
FIG. 1 is an exploded perspective view of one example of a fold rear-view mirror assembly for motor vehicles.

In the drawings, a fold rear-view mirror assembly 100 for motor vehicles is shown. The rear-view mirror assembly 100 comprises a base member 120 that is attached to a fixed portion of a motor vehicle.

The rear-view mirror assembly 100 also comprises a mirror housing 130. The mirror housing 130 has a mirror pane receiving portion 135 for receiving a mirror pane therein (not shown) for providing a substantially rear field of view to a vehicle driver when the mirror housing 130 is positioned in a driving position.

The mirror housing 130 is mounted to the base member 120 such that the mirror housing 130 can be rotated to the base member 120 between at least a mirror operative condition or drive position and a mirror folded condition or parking position, and vice versa. Rotation of the mirror housing 130 to the base member 120 may be carried out, for example, through the use of motor means and drive means (not shown).

As shown in FIG. 1, a shaft 140 is provided for allowing the mirror housing 130 to be rotated to the base member 120 between the above mentioned mirror operative and mirror folded conditions, and vice versa.

Specifically, the shaft 140 comprises a tubular stem 142 having lower and upper ends 144, 145. The shaft upper end 145 extends radially defining a stop portion 320. The stop portion 320 will be described further below. In use, the shaft 140 is arranged with its tubular stem 142 inserted within a shaft housing 150 that is formed by the mirror housing 130 and the base member 120.

Shaft retaining means 200 associated with the tubular stem 142 of the shaft 140 are also provided. The shaft retaining means 200 comprise protrusions extending radially out of the tubular stem 142 of the shaft 140. Protrusions are shaped and arranged to pass through corresponding grooves formed in the shaft housing 150 in at least one of the base member 120 and the mirror housing 130. After passing the tubular stem 142 of the shaft 140 with its radially extending protrusions passed through the grooves in the shaft housing 150, the tubular stem 142 is rotated a certain angle until the protrusions abut the bottom portion of the shaft housing 150 such that the shaft 140 is at least axially retained in the shaft housing 150.

An elastic element in the form of a compression spring 160 is provided surrounding the shaft 140 as shown in FIG. 1. The compression spring 160 is arranged between the base member 120 and the mirror housing 130 such that an elastic force is applied thereon.

In the non-limiting example shown, two sets of protrusions, axially spaced from each other, are provided: a first set of protrusions 210' near the shaft lower end 144 and a second set of protrusions 210" arranged between the lower and upper ends 144, 145 of the shaft 140. Each set of protrusions 210', 210" may be contained in a plane transversal to a longitudinal axis of the shaft 140. Both sets of protrusions 210', 210" may be radially aligned with each other.

Correspondingly, in the non-limiting example shown, the shaft housing 150 has two sets of grooves 155', 155" axially spaced from each other: a first set of grooves 155' formed in a bottom portion of the shaft housing 150 in the base member 120 and a second set of grooves 155" formed in a flange 152 of the shaft housing 150 in the mirror housing 130. Each set of grooves 155', 155" may be contained in a plane transversal to a longitudinal axis of the shaft 140. Both sets of grooves 155', 155" may be radially aligned with each other.

Additionally, in the non-limiting example shown, the shaft housing 150 has two sets of abutments 158', 158" axially spaced from each other: a first set of abutments 158' formed in the bottom portion of the shaft housing 150 in the base member 120 and a second set of abutments 158" formed in the flange 152 of the shaft housing 150 in the mirror housing 130. Each set of abutments 158', 158" may be contained in a plane transversal to the longitudinal axis of the shaft 140. Both sets of abutments 158', 158" may be radially aligned with each other.

The first set of protrusions 210' is shaped and arranged to pass through both sets of grooves 155', 155". Thus, when the shaft lower end 144 is inserted into the shaft housing 150, the first set of protrusions 210' passes first through the second set of grooves 155" and then through the first set of grooves 155'. Next, the shaft 140 is rotated a certain angle until the first set of protrusions 210' abut the bottom portion of the shaft housing 150 at the first set of abutments 158' such that the shaft 140 is axially and rotationally retained in the shaft housing 150. In other words, the shaft 140 is engaged to the base member 120 with a bayonet connection provided by the first set of protrusions 210' and the first set of abutments 158' in the shaft housing 150. As a result, the compression spring 160 is compressed between the mirror housing 130 and the base member 120 such that they are pivotally attached.

The second set of protrusions 210" is shaped and arranged to pass through the second set of grooves 155" but not through the first set of grooves 155'. Thus, when the shaft lower end 144 is inserted into the shaft housing 150, the second set of protrusions 210" passes through the second set of grooves 155". Once the second set of protrusions 210" passes through the second set of grooves 155", the shaft 140 is rotated a certain angle until the second set of protrusions 210" abut the flange 152 of the shaft housing 150 at the second set of abutments 158" such that the shaft 140 is axially retained in the shaft housing 150. In other words, the shaft 140 is engaged to the mirror housing 130 with a bayonet connection provided by the second set of protrusions 210" and the second set of abutments 158" in the shaft housing 150. As a result, the shaft 140, the compression spring 160 and the mirror housing 130 become attached therebetween. In this way, these elements may be preassembled and stored as a sub-unit instead of as separate elements.

In this example, the axial spacing between the first and second sets of grooves 155', 155" is different from the axial spacing between the first and second sets of protrusions 210', 210". As a result, when the first set of protrusions 210' abut the first set of abutments 158', the second set of protrusions 210" does not abut the second set of abutments 158". Preferably, the axial spacing between the sets of grooves 155', 155" is smaller than the axial spacing between the sets of protrusions 210', 210".

The rear-view mirror assembly 100 also includes safety means for preventing the shaft 140 from being released from the shaft housing 150. The safety means comprise first and second stop portions 310, 320. At least one of the first and second stop portions 310, 320 may be separated parts attached to the mirror housing 130 and the shaft 140, respectively, or they may be formed integrally therewith.

Figure 2:
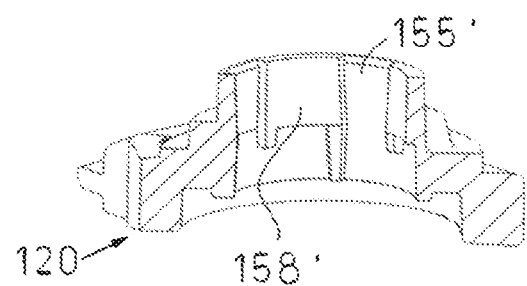
FIG. 2 is a fragmentary, sectional perspective view, of one portion of the base member of the fold rear-view mirror assembly.
Figure 3:
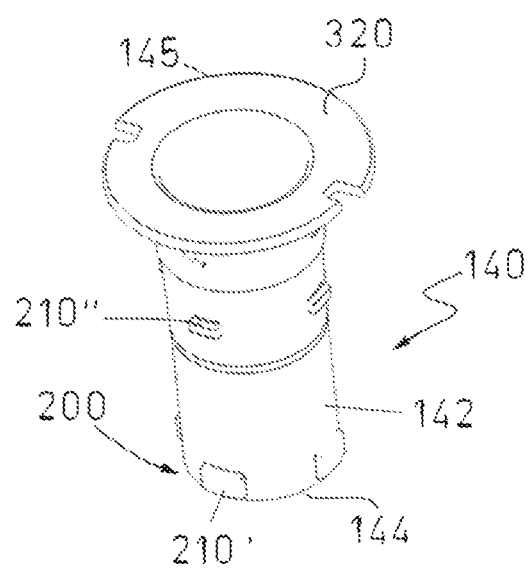
FIG. 3 is a perspective view of one example of a shaft to be used in the present fold rear-view mirror assembly.
Figure 4:
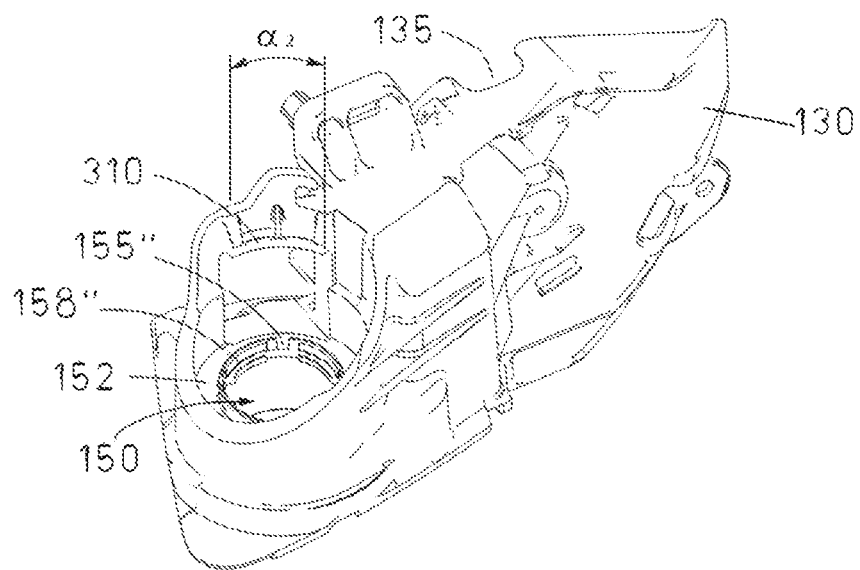
FIG. 4 is a perspective view of one example of a mirror housing.
Figure 5:
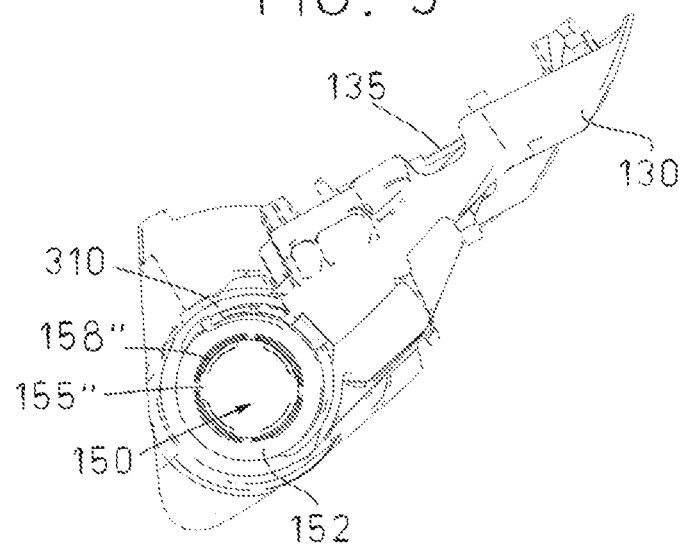
FIG. 5 is a top view of the mirror housing shown in FIG. 4.

In the non-limiting example shown, the first stop portion 310 is a flange formed in the mirror housing 130 extending radially towards an interior of the shaft housing 150. The second stop portion 320 is formed in the shaft 140, and specifically in a shaft upper end 145 as stated above, that is, the shaft upper end 145 extends into said second stop portion 320 as shown in FIGS. 1 and 2. In the specific example shown in said figures, the second stop portion 320 is a projecting portion extending radially outwardly from the shaft 140 substantially covering half the circumference thereof.

The first and second stop portions 310, 320 are arranged such that:
  in a first relative angular position of the mirror housing 130 and the shaft 140, both the first and the second stop portions 310, 320 do not interfere with one another, allowing the shaft 140 to be inserted into the shaft housing 150; and
  in a second relative angular position of the mirror housing 130 and the shaft 140, both the first and the second stop portions 310, 320 interfere with one another, such that the shaft 140 is prevented from being released from the shaft housing 150 by the action of the compression spring 160 in case of failure of the shaft retaining means 200. For this purpose, the first stop portion 310 is configured to be impacted by the second stop portion 320 due to the effect of the compression spring 160 in case of failure of the shaft retaining means 200.

In this first relative angular position, the protrusions and the grooves are radially aligned with each other such that the shaft 140 can be inserted in the shaft housing 150, whereas, in the second relative angular position, the protrusions and the grooves are not radially aligned with each other such that, once the shaft 140 has been inserted in the shaft housing 150, the shaft 140 is retained therein by the complementary abutments 158.

The first stop portion 310 or the second stop portion 320, or both, are configured to be either broken or plastically or elastically deformed in case the mirror housing 130 is impacted by the shaft 140 due to the thrust of the compression spring 160 in case of failure of the shaft retaining means 200, for example in case the protrusions in the tubular stem 142 of the shaft 140 break. Breaking or deformation of the first stop portion 310 or the second stop portion 320, or both, allows impact energy to be absorbed safely.

The first stop portion 310 or the second stop portion 320, or both the first and second stop portions 310, 320, may be a single element or they may comprise a number of annular sectors. In any case, said stop portions may comprise a single part or a number of annular sectors having an angular extension from about 45 to 180 degrees around the shaft 140. The angular extension of the first stop portion 310 may be equal to or different from the angular extension of the second stop portion 320, as required, as long as, in case of failure of the shaft retaining means 200, the first and second stop portions 310, 320 allow to absorb impact energy.

Although only a number of specific examples of the present fold rear-view mirror assembly for motor vehicles have been disclosed herein, it will be understood by those skilled in the art that other alternative examples and/or uses and obvious modifications and equivalents thereof are possible. For example, a number of additional features may be also envisaged for the present rear-view mirror assembly 100. For example, although not shown in the drawings, one or more of an antenna for communicating with a radio-frequency reception system, an actuation mechanism configured to provide orientation of the mirror pane to adjust the rear field of view of the vehicle driver, an outdoor temperature sensing device configured to sense an outdoor temperature of the vehicle and one or more illumination modules, may be provided in the mirror housing 130 and/or in the mirror base 120. Thus, the present disclosure covers all possible combinations of the particular examples described herein. Thus, the scope of the present disclosure should not be limited by particular examples, but should be determined only by a fair reading of the claims that follow.

Reference signs related to drawings and placed in parentheses in a claim, are solely for attempting to increase the intelligibility of the claim, and shall not be construed as limiting the scope of the claim.

The invention claimed is:

1. A fold rear-view mirror assembly for motor vehicles, the assembly comprising:
    a base member for being mounted on a motor vehicle;
    a mirror housing;
    a shaft adapted to be inserted within a shaft housing formed by at least one of the base member and the mirror housing such that the mirror housing is allowed to be rotated relative to the base member between a mirror operative condition and a mirror folded condition, and vice versa;
    an elastic element associated with the shaft and arranged such that a force is applied on both the base member and the mirror housing through the shaft;
    means for at least axially retaining the shaft in the shaft housing; and
    safety means for preventing the shaft from being released from the shaft housing, the safety means comprising a first stop portion formed in the mirror housing and a second stop portion formed in the shaft,
    where the first and second stop portions are arranged such that in a first relative angular position of the shaft and the mirror housing, both the first and the second stop portions do not interfere with one another such that the shaft is insertable in the shaft housing and, in another, different, second relative angular position of the shaft and the mirror housing, both the first and the second stop portions interfere with one another so as to prevent the shaft from being released from the shaft housing by the action of the elastic element.

2. The assembly according to claim 1, where the first stop portion is configured to be impacted by the second stop portion due to the effect of the elastic element in case of failure of the shaft retaining means.

3. The assembly according to claim 1, where at least one of the first and second stop portions is configured to be broken due to the effect of the elastic element in case of failure of the shaft retaining means so as to absorb impact energy of the second stop portion when the shaft impacts the mirror housing.

4. The assembly according to claim 1, where at least one of the first and second stop portions is configured to deform without breaking due to the effect of the elastic element in case of failure of the shaft retaining means so as to absorb impact energy of said at least one of the first and second stop portions when the shaft impacts the mirror housing.

5. The assembly according to claim 4, where at least one of the first and second stop portions is configured to deform elastically.

6. The assembly according to claim 4, where at least one of the first and second stop portions is configured to deform plastically.

7. The assembly according to claim 1, where the first and second stop portions formed respectively in the mirror housing and in the shaft define a bayonet-type safety means.

8. The assembly according to claim 1, where at least one of the first and second stop portions comprises a number of annular sectors.

9. The assembly according to claim 1, where at least one of the first and second stop portions has an angular extension ($\alpha 1$; $\alpha 2$) ranging from 45 to 180 degrees around the shaft.

10. The assembly according to claim 1, where the angular extension ($\alpha 1$) of the first stop portion is different from the angular extension ($\alpha 2$) of the second stop portion.

11. The assembly according to claim 1, where the means for axially retaining the shaft in the shaft housing comprises at least one protrusion extending radially out of the shaft suitable for passing through a corresponding groove formed in the shaft housing.

12. The assembly according to claim 11, where the corresponding groove is formed in the base member.

13. The assembly according to claim 1, where the second stop portion is formed at one end of the shaft.

14. The assembly according to claim 1, where the retaining means are arranged so as to not interfere with the shaft housing in the first relative angular position of the shaft and the mirror housing.

* * * * *